US010592490B2

(12) United States Patent
Luo et al.

(10) Patent No.: US 10,592,490 B2
(45) Date of Patent: Mar. 17, 2020

(54) POSITION CODING BASED ON SPATIAL TREE WITH DUPLICATE POINTS

(75) Inventors: Tao Luo, Beijing (CN); Wenfei Jiang, Beijing (CN); Kangying Cai, Beijing (CN)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 14/356,748

(22) PCT Filed: Nov. 25, 2011

(86) PCT No.: PCT/CN2011/082951
§ 371 (c)(1),
(2), (4) Date: May 7, 2014

(87) PCT Pub. No.: WO2013/075334
PCT Pub. Date: May 30, 2013

(65) Prior Publication Data
US 2014/0324914 A1 Oct. 30, 2014

(51) Int. Cl.
*G06F 16/22* (2019.01)
*G06T 17/00* (2006.01)
(Continued)

(52) U.S. Cl.
CPC .......... *G06F 16/2246* (2019.01); *G06T 9/40* (2013.01); *G06T 17/005* (2013.01); *H04N 19/96* (2014.11); *H04N 19/129* (2014.11)

(58) Field of Classification Search
CPC ......... G06F 17/30292; G06F 17/30241; G06F 17/30961; G06F 17/30327; G06F 17/30554; G06F 17/30528
(Continued)

(56) References Cited

U.S. PATENT DOCUMENTS 6,501,083 B1    12/2002 Kamijo
6,993,538 B2 *   1/2006 Gray ................. G06F 17/30241
                                            340/988
(Continued)

FOREIGN PATENT DOCUMENTS

JP    1174172     7/1989
JP   11221990     8/1999
(Continued)

OTHER PUBLICATIONS

Shen et al: "A Fast Volume Rendering Algorithm for Time-Varying Fields Using a Time-Space Partitioning (TSP) Tree"; Proceedings Visualization '99. Vis '99. San Francisco. CA. Oct. 24-29, 1999; [Annual IEEE Conference on Visualization]; Los Almitos, CA : IEEE Comp. Soc. US. Oct. 24, 1999 (Oct. 24, 1999), pp. 371-377. XP000895706, ISBN: 978-0-7803-5899-7 * Paragraph 3.4 Memory Optimization and Out-of-Core Rendering *.
(Continued)

*Primary Examiner* — Hosain T Alam
*Assistant Examiner* — Nicholas E Allen
(74) *Attorney, Agent, or Firm* — Brian J. Dorini; Paul P. Kiel

(57) ABSTRACT

A method and an apparatus for constructing a spatial tree data structure corresponding to a region. According to the present principles, a cell may include therein a point or a set of points that are determined to be duplicate points. In an embodiment the duplicate points are determined based on the size of the points included within the cell. The inclusion of duplicate points within a particular cell, rather than further subdividing the cell, provides coding efficiency. The present principles are particularly advantageous in the context of quadtree or octree type partitioning, and may be used in 3D mesh coding.

7 Claims, 8 Drawing Sheets

(51) Int. Cl.
*H04N 19/96* (2014.01)
*G06T 9/40* (2006.01)
*H04N 19/129* (2014.01)

(58) Field of Classification Search
USPC .................................................. 707/797, 757
See application file for complete search history.

(56) References Cited

U.S. PATENT DOCUMENTS

| | | | |
|---|---|---|---|
| 7,088,363 B2 | 8/2006 | Kase et al. | |
| 2002/0190982 A1* | 12/2002 | Kotcheff | G06T 17/20 345/420 |
| 2005/0122549 A1* | 6/2005 | Goulanian | G03H 1/30 359/3 |
| 2005/0203930 A1* | 9/2005 | Bukowski | G06F 17/30241 |
| 2005/0249426 A1* | 11/2005 | Badawy | G06T 9/001 382/241 |
| 2006/0053163 A1* | 3/2006 | Liu | H04L 67/38 |
| 2006/0074609 A1* | 4/2006 | Freeman | G06Q 10/06 703/1 |
| 2006/0290695 A1* | 12/2006 | Salomie | G06T 17/20 345/420 |
| 2008/0030500 A1* | 2/2008 | Krishnan | G06T 15/08 345/424 |
| 2008/0052337 A1* | 2/2008 | Adams | G06F 17/12 708/446 |
| 2008/0238919 A1* | 10/2008 | Pack | G06T 15/04 345/420 |
| 2009/0109219 A1* | 4/2009 | DeCoro | G06T 17/20 345/423 |
| 2009/0202160 A1* | 8/2009 | Kim | G06T 17/20 382/233 |
| 2009/0213113 A1* | 8/2009 | Sim | G06T 17/005 345/419 |
| 2009/0271156 A1* | 10/2009 | Kageura | G06F 17/5018 703/1 |
| 2010/0082703 A1* | 4/2010 | Zhou | G06F 17/30961 707/803 |
| 2010/0094597 A1* | 4/2010 | Blain | G06T 17/20 703/1 |
| 2010/0235146 A1* | 9/2010 | Bennett | G06T 17/10 703/1 |
| 2011/0037763 A1* | 2/2011 | Lee | G06T 9/001 345/419 |
| 2011/0046923 A1* | 2/2011 | Lee | G06T 9/001 703/1 |
| 2011/0091118 A1* | 4/2011 | Ahn | G06T 9/00 382/232 |
| 2011/0169828 A1* | 7/2011 | Pedersen | G06T 17/20 345/423 |
| 2011/0169924 A1* | 7/2011 | Haisty | H04N 9/3147 348/51 |
| 2011/0251830 A1* | 10/2011 | Hilliard | G06F 17/5018 703/1 |
| 2011/0282473 A1* | 11/2011 | Pavlovskaia | A61B 19/50 700/98 |
| 2011/0285708 A1* | 11/2011 | Chen | G06T 9/004 345/420 |

FOREIGN PATENT DOCUMENTS

| | | |
|---|---|---|
| JP | 2001126980 | 5/2001 |
| WO | WO2010149492 | 12/2010 |

OTHER PUBLICATIONS

Cai et al: "3d data code and transmission over the internet" Proceeding WEB3D'07 Proceedings of the Twelfth International Conference on 3D Web Technology, Jan. 1, 2007 (Jan. 1, 2007). pp. 53-56, XP002743395, * Paragraph 3.1 "Geometric data encoding".

* cited by examiner

| Num_DPCell | Sign | Position k | Num_P_Cell - 3 | ○ ○ ○ ○ |
|---|---|---|---|---|
| 1010 | 1020 | 1030 | 1040 | 1050 |

POSITION CODING BASED ON SPATIAL TREE WITH DUPLICATE POINTS

This application claims the benefit, under 35 U.S.C. § 119 of WO Patent Application PCT/CN2011/082951, filed 25 Nov. 2011.

FIELD OF THE INVENTION

This invention relates to three dimensional (3D) models, and more particularly to a method and an apparatus for generating a sequence of symbols associated with a spatial tree data structure, and a method and an apparatus for processing the encoded sequence.

BACKGROUND OF THE INVENTION

In 3D mesh coding, geometry data is usually compressed by spatial tree decomposition based approaches, e.g. Octree based methods. Besides the support of progressive coding, they achieve a considerable compression gain. In an Octree based method, a coder recursively subdivides the smallest axis-aligned bounding box of given 3D model into eight children cells. A cell is recursively subdivided until each nonempty cell is small enough to contain only one vertex and enable a sufficiently precise reconstruction of the vertex position. For each cell subdivision, whether or not each child cell is empty is signified by a symbol. A symbol sequence describing the Octree, called the traversal symbol sequences is generated by first traversing and collecting the symbols representing the subdivision of the nodes. Then an entropy codec is utilized to compress that symbol sequence.

SUMMARY OF THE INVENTION

According to the present principles, there is described an implementation of a method of constructing a spatial tree data structure corresponding to a region, comprising: selecting an area within the region; determining whether the area includes duplicate points, wherein the duplicate points comprise two or more points in the area; if the area includes duplicate points, recording the area information indicating the presence of the duplicate points for the area, and stopping further sub-dividing of the area.

The region may be further divided into areas that are recursively subdivided so that each of the finally sub-divided areas includes only a point or duplicate points. The determination of the presence of duplicate points may be performed on the basis of the size of the points as further discussed below. The present principles may advantageously be used in generating tree data structures in connection with 3D mesh coding.

According to the present principles, there is described another implementation of an apparatus for constructing a spatial tree data structure corresponding to a region, comprising: means for selecting an area within the region; means for determining whether the area includes duplicate points, wherein the duplicate points comprise two or more points in the area; means for, if the area includes duplicate points, recording the area information indicating the presence of the duplicate points for the area, and stopping further sub-dividing of the area.

The region may be further divided into areas that are recursively subdivided so that each of the finally sub-divided areas includes only a point or duplicate points. The determination of the presence of duplicate points may be performed on the basis of the size of the points as further discussed below. The present principles may advantageously be used in generating tree data structures in connection with 3D mesh coding.

The present principles also provide a computer readable medium having stored thereon instructions for performing the steps described above.

The present principles also provide a computer readable medium having stored thereon a symbol sequence generated by the steps described above.

The details of one or more implementations are set forth in the accompanying drawings and the description below. Even if described in one particular manner, it should be clear that implementations may be configured or embodied in various manners. For example, an implementation may be performed as a method, or embodied as an apparatus, such as, for example, an apparatus configured to perform a set of operations or an apparatus storing instructions for performing a set of operations, or embodied in a signal. Other aspects and features will become apparent from the following detailed description considered in conjunction with the accompanying drawings and the claims.

DETAILED DESCRIPTION

Spatial tree based approaches can be used to compress geometry data, such as random point positions and vertex positions of watertight 3D models. They organize input spatial points by an octree or a k-d tree. The tree is traversed and the information required for tree restoration is stored.

Initially, a bounding box is constructed around all points of a 3D model. The bounding box of all 3D points is regarded as a single cell in the beginning. To build the spatial tree, a cell is recursively subdivided until each non-empty cell is small enough to contain only one vertex and enable a sufficiently precise reconstruction of the vertex position. As vertex positions can be restored from central coordinates of corresponding cells, the spatial tree based algorithms may achieve multi-resolution compression with the same compression ratio as single-resolution compression algorithms.

Figure 1:
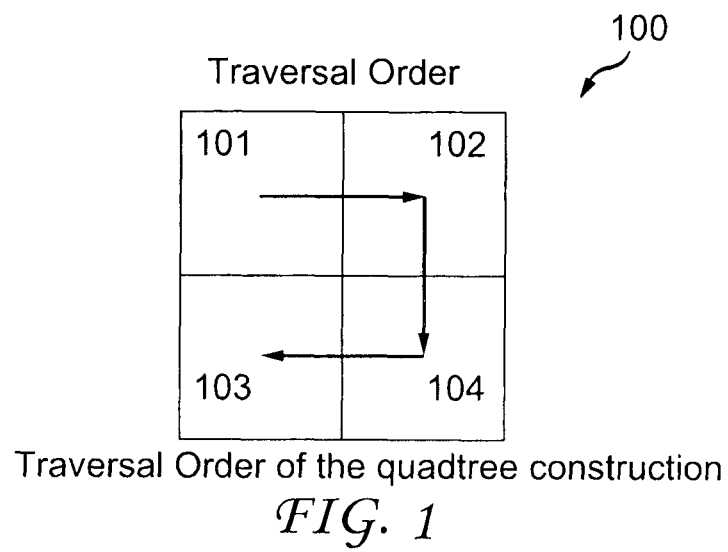
FIG. 1 shows an exemplary cell, or area, of a region that is sub-divided and traversed to determine the presence of the points in the cell.

An octree based approach subdivides, in each iteration, a non-empty cell into eight child cells. For ease of illustration, 2D examples describing a quadtree are shown in FIG. 1. The traversal orders are denoted by arrows. For encoding, a current parent cell is split into four child cells that are traversed in a pre-defined order, and a single bit per child cell indicates whether or not there is a point within the child cell. For example, in FIG. 1, a parent cell 100 is traversed as shown in arrows. Child cells 101, 102, 104, and 103 are traversed and a single bit indicates whether there is a point within each of the cells traversed.

Figure 2:
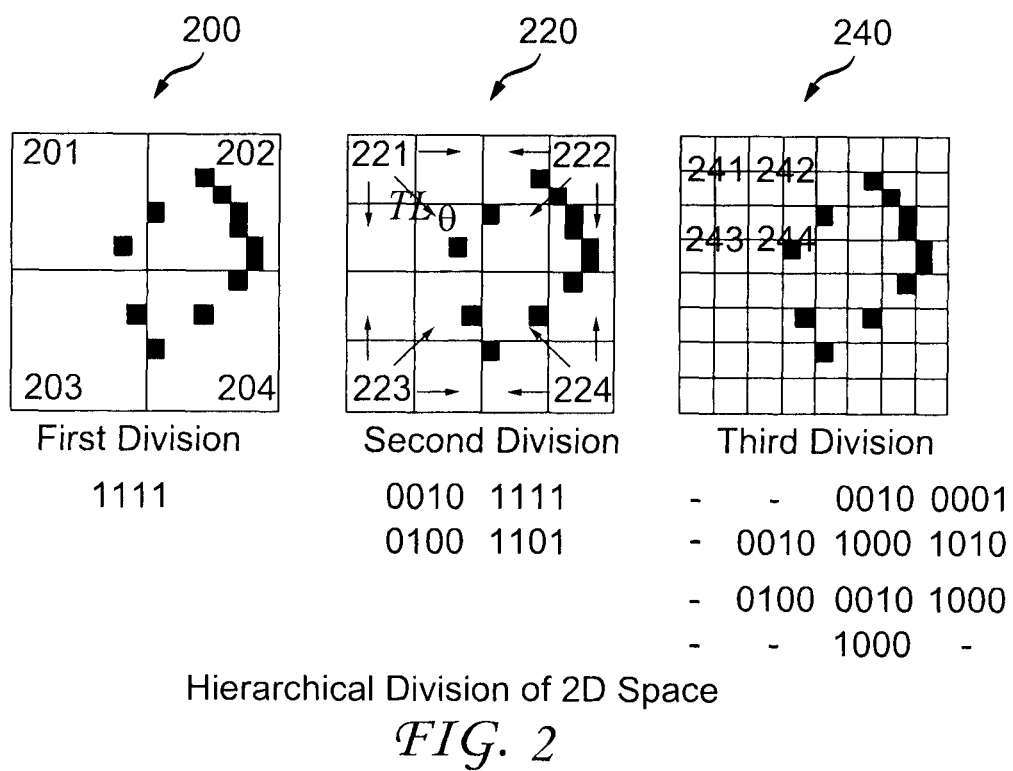
FIG. 2 shows an exemplary region having points, which is iteratively divided so that each cell includes one point.

FIG. 2 illustrates the process of building a quadtree, wherein the small black squares indicate the points to be coded. This is a recursive process in which the cells that include at least one point may be further sub-divided until each cell only includes one point. In the first iteration, the plane is divided into 4 cells 201, 201, 203 and 204 and traversed as indicated in FIG. 1. Since each sub-cell contains at least one point, the corresponding non-empty cell configuration is 1111. Each of the cells that include a point is further sub-divided into 4 equal sized cells as shown in block 220. The sub-cells in block 220 are then traversed within the 4 cell blocks. An example is illustrated for cell block 221, wherein each cell in the block is traverse in the order shown in FIG. 1 resulting in a correspond non-empty-child cell configuration of 0010. The remaining 4 cell blocks in block 220 are also traversed resulting in configurations 0010 1111 0100 and 1101.

Figure 3:
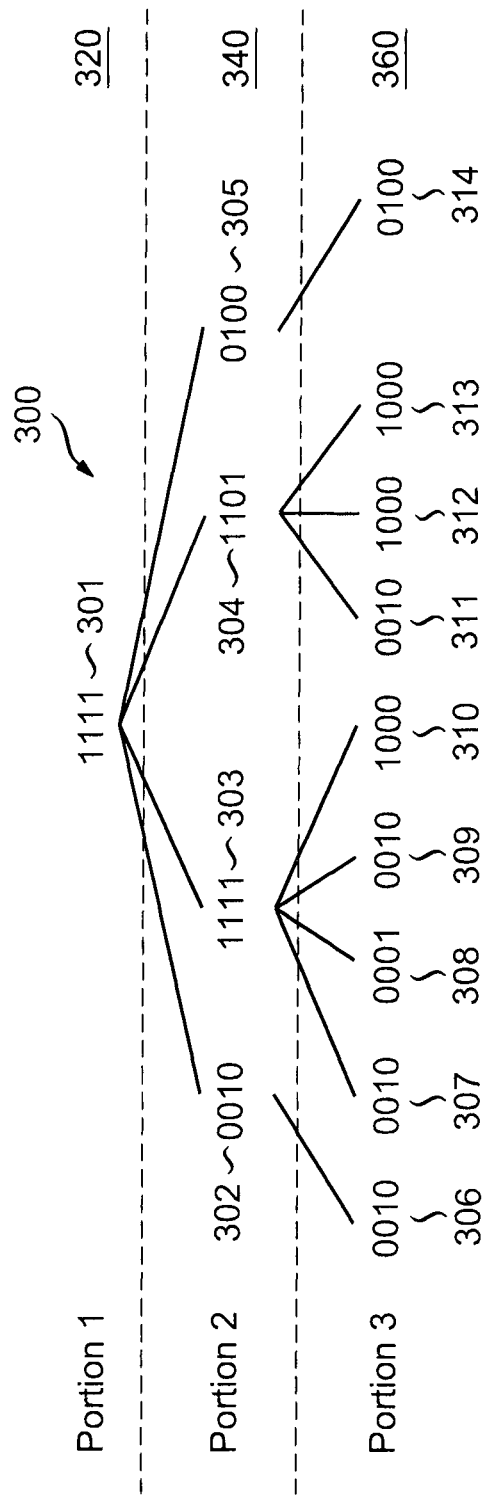
FIG. 3 shows an exemplary quadtree representation based on the region of FIG. 2.

Again, each cell that includes a point is further sub-divided into equal size blocks having 4 cells each, and each cell is traversed to determine the corresponding non-empty child cell configuration. The result in this case is: - - 0010 0001, etc. and the quadtree representation is shown in FIG. 3.

Although the above description is provided with respect to a quadtree construction, a similar method can be applied to an octree scheme, wherein the parent cell in three dimensions can be split into eight child cells and each of the child cells can be traversed in a predetermined manner to determine which cells include a point. Each cell that includes a point is further split into eight cells, and is again traversed in a predetermined manner to determine which cells include a point. This process continues until each cell includes a single point, similar to the process described above.

Note that the specific traversal order of child cells within a parent cell is not very relevant for the present embodiments. In principle, any traversal order can be used for the present embodiments.

The above approaches are proposed to represent vertex positions of watertight 3D models. The prediction methods become invalid when representing random distributed points. Thus, we prefer to employ the basic method of spatial tree to do position coding, in consideration of complexity and robustness. Take quadtree for example, the non-empty-child-cell configuration is denoted by 4-bit binaries, covering all the 15 combinations. And the number of non-empty-child cells T is not needed any more consequently.

Figure 4:
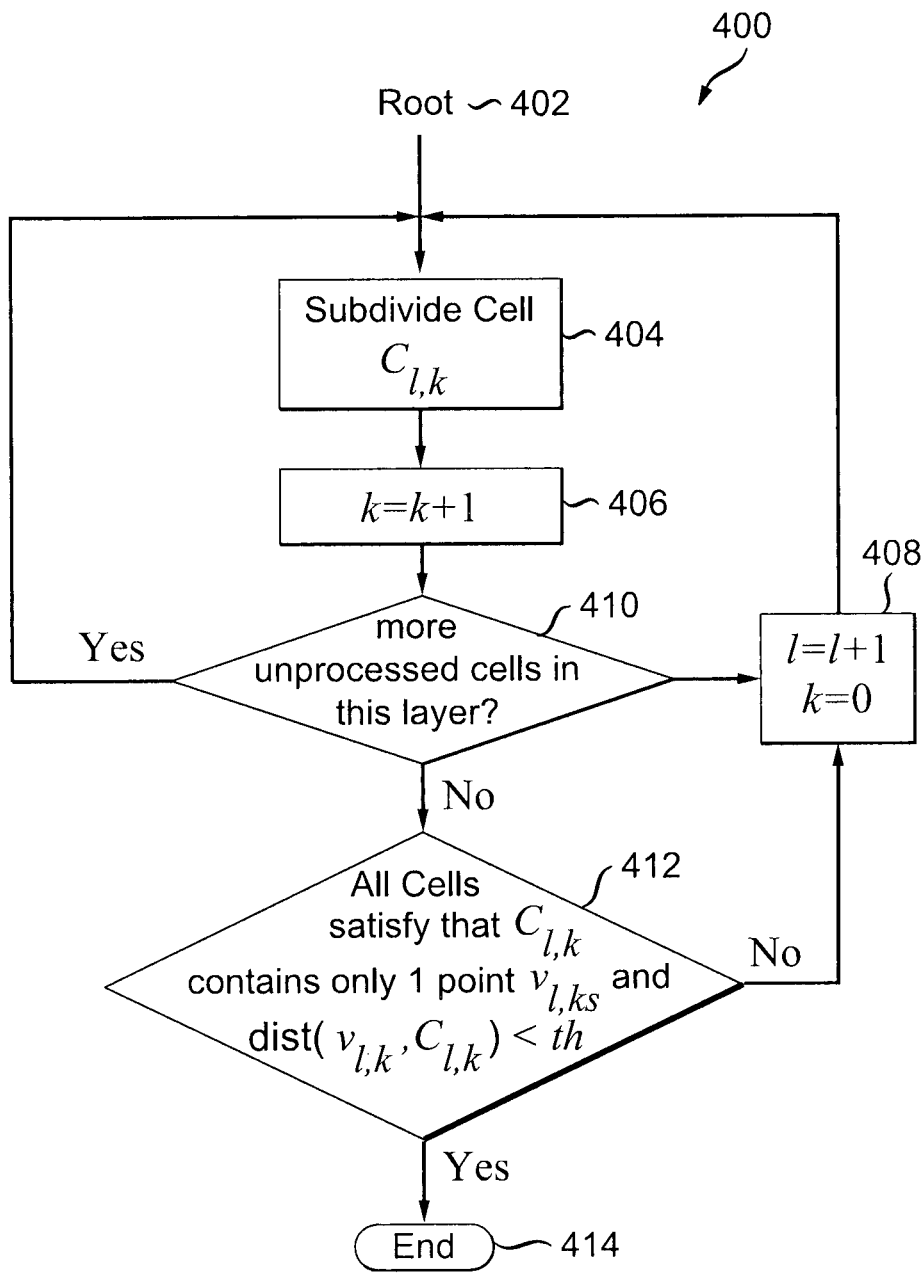
FIG. 4 shows a conventional method for subdividing cells, or areas, in generating a tree data structure.

FIG. 4 shows the flow chart of the steps of the above described method for building a quadtree, wherein th is maximum error allowed. the $C_{l,k}$ denotes the kth cell at the l layer and $c_{l,k}$ is the central point of $C_{l,k}$. Whenever a subdivision is finished, the encoder checks the following two conditions:

(a) Every sub-cell at the deepest layer contains at most one point.
(b) The distance between the center of the sub-cell and the point inside is smaller than the maximum error.

The above mechanism works well on the evenly-distributed points. However, it may not be efficient when the points are unevenly distributed. Consider the case in FIG. 5. Here, suppose the required maximum error is 0.125, and then two subdivisions are enough for most points. However, points 502 and 504 are extremely close and the stop condition (a) cannot be satisfied. Thus, the subdivision process must continue and further sub-divide the cells, resulting in a quadtree construction shown in FIG. 6. As a result, each point finally occupies one cell. However, the additional steps to generate the results shown in box 610 in FIG. 6 are useless, so the compression is inefficient. Furthermore, in the unevenly-distributed points situation, some pairs of points are close enough to be regarded as duplicate points, which do not need to be subdivided further. For the efficiency of compression, the present invention provides that the stop condition during spatial tree construction can be relaxed, or adjusted, so that under certain conditions a cell at the deepest layer can contain more than one point.

In particular, the present invention provides an improved method and apparatus for constructing the spatial tree for cells having unevenly-distributed points. In the prior methods, every point should occupy a cell at the deepest layer. However, the inventors have recognized that there are some close pairs of points that can be regarded as duplicate points. It makes the compression inefficient to subdivide these kinds of points. Therefore, the constraint of spatial tree construction can be relaxed to allow more than one point in each cell. In accordance with the present invention, to improve the compression efficiency for unevenly-distributed points, duplicate points in one cell are detected and a specification for this kind of cells is employed in the codec module.

In an embodiment, the duplicate points are defined in one cell to relax the constraint of conventional spatial trees. For the unevenly-distributed points in one cell, the size of points can be calculated as the radius of their circumscribed sphere. Two thresholds with regard to the number of points and the size are employed to determine whether these points are duplicate points or not.

According to the present principles, cells that contain duplicate points are not further subdivided. In the codec module, a specification for this kind of cells is proposed to record the relevant information for compression.

Spatial Tree Construction Considering Duplicate Points

Figure 7:
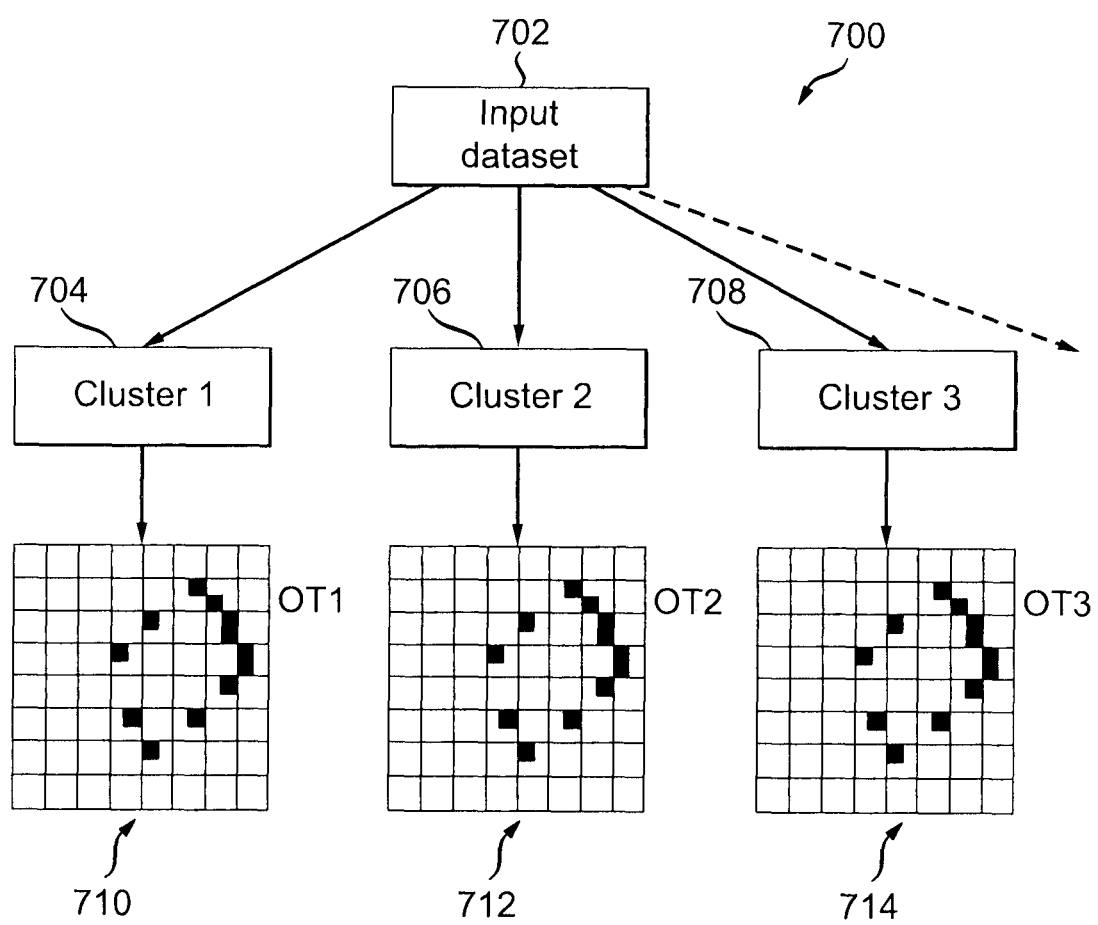
FIG. 7 shows segregating of an input dataset with clusters.
Figure 8:
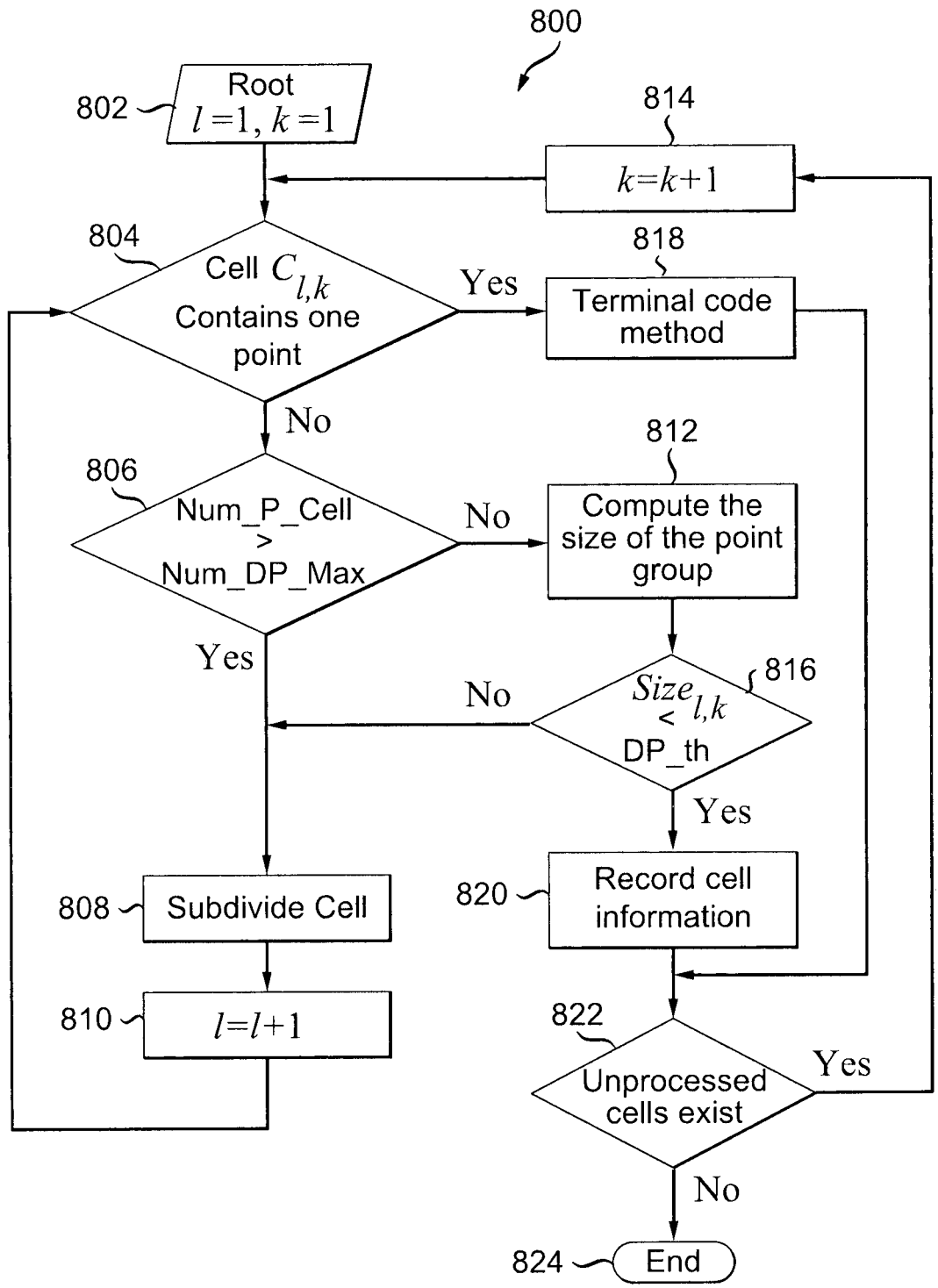
FIG. 8 shows an exemplary method including steps for subdividing cells, or areas, according to the present principles.

FIG. 8 shows the flowchart of spatial tree construction considering duplicate points in accordance with the present principles. Using the method proposed in, for example, PCT Application (PCT/CN2009/001143) entitled "Cluster Based Compression Algorithm for 3D Mesh Models Using Multiple KD-Trees" by K. Cai, Y. Jin, and Z. Chen, the input points are first clustered according to their spatial positions. Each cluster contains a set of points which are spatially aggregated. Then, each cluster is compressed by organizing all points in it with an Octree as shown in FIG. 7.

For each octree, following the conventional constructing method, the unevenly-distributed points are subdivided into cells at different levels. However, to improve the compression efficiency, the cells at the deepest level can contain more than one point in our assumption. In an embodiment, the duplicate points may be defined as follows.

Num_DP_Max denotes the maximum number of points that a cell can accommodate. Its value is 16 in an embodiment. While constructing the spatial tree, the number of points Num_P_Cell in each cell is checked. If 1<Num_P_Cell<=Num_DP_Max, the points in this cell are checked to determine whether they are duplicate points or not. Otherwise, this cell will be subdivided further if the points are not duplicate points until the points in its sub-cells are duplicate points or its sub-cells contain only one point.

To define the duplicate points, the size encompassing the accommodated points in one cell is calculated as the minimum radius of circumscribed sphere. If the size is smaller than a certain threshold, the discrete points are determined to be duplicate points.

In a cell there are Num_P_Cell points($p_{l,k,0}$, $p_{l,k,1}$, ..., $p_{l,k,m}$, ...) Thus, the center of these points can be computed as, $$p_{center} = \frac{1}{\text{Num\_P\_Cell}} \sum_m p_{l,k,m}.$$

Moreover, the maximum values of x, y and z are expressed as $x_{max}$, $y_{max}$, $z_{max}$. Thus the size of accommodated points in this cell is computed as, $$Size_{l,k} = \sqrt{(p_{center_x} - x_{max})^2 + (p_{center_y} - y_{max})^2 + (p_{center_z} - z_{max})^2}.$$

If the size is smaller than a threshold DP_th, the points in this cell are determined to be duplicate points. As a result, this cell is no longer subdivided and its relevant information will be recorded in the codec. Here, DP_th is defined as the minimum distance between the center of points and the center of sub-cells at the next level, namely, $$\text{DP\_th} = \min_k \| p_{center} - c_{l \to 1, k} \|.$$

Specification for the Cells Containing Duplicate Points

Figure 5:
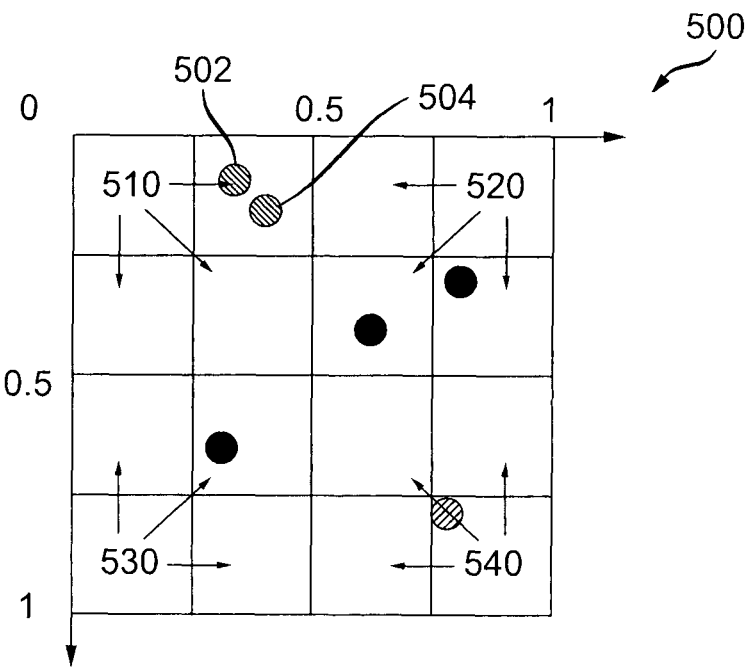
FIG. 5 shows an exemplary region having a set of duplicate points with a cell.
Figure 6:
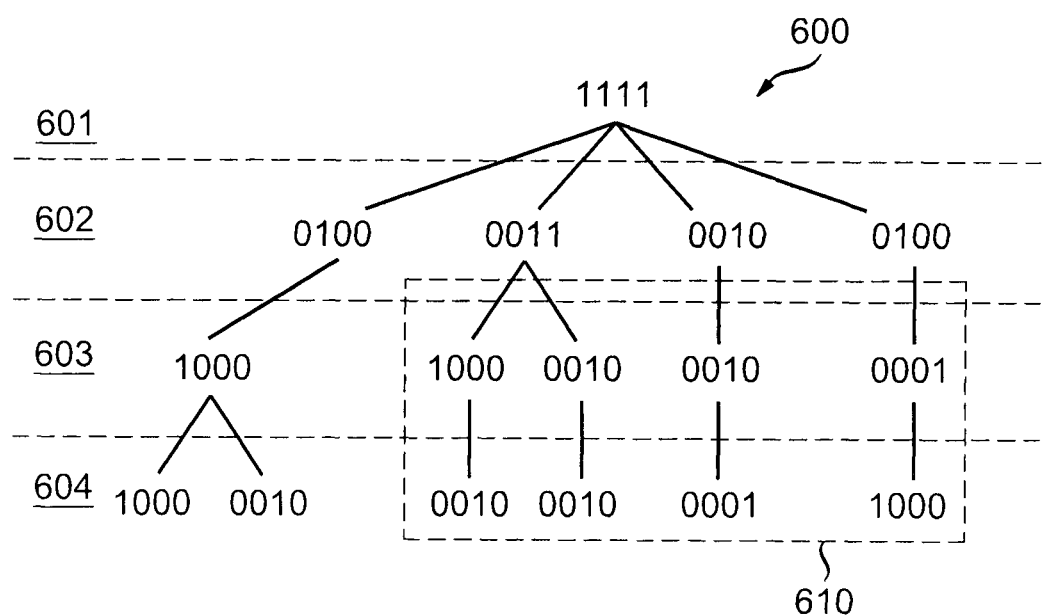
FIG. 6 shows a quadtree representation which results from applying a convention method for subdividing cells to the region of FIG. 5.
Figures 9, 10:
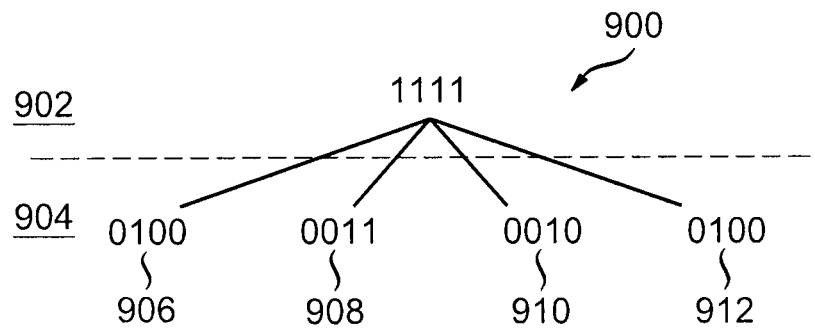
FIG. 9 shows a quadtree representation of the region of FIG. 5 according to the present principles.
FIG. 10 shows an exemplary data unit generated for duplicate points according to the present principles.

Take the case in FIG. 5 for example. Using the proposed spatial tree construction, the quadtree structure is generated as shown in FIG. 9. Each of the cells 520, 530, and 540 contains only one point, which is processed using the previous method of terminal code. The cell 510 contains two points, which are verified using the proposed definition of duplicate points. If they are determined as duplicate points, the cell 510 does not need to be subdivided further. Relevant information about this kind of cells can be specified in the codec.

For the constructed spatial tree, we propose a specification of the cells containing duplicate points in the codec module. In one embodiment, during encoding of these cells, the maximum number is assumed to be five percent of the number of input points, i.e. Num_DPCell_Max=0.05*Num_Point. The number may be adjusted as desired. Consequently, the number of cells with duplicate points Num_DPCell is first encoded within $\lfloor \log_2 \text{Num\_DPCell\_Max} \rfloor$ bits in field 1010.

Then, the positions of these cells k and the number of duplicate points in each cell Num_P_Cell are encoded successively in fields 1030 and 1040. According to the value of Num_P_Cell, the position value k is assigned a sign bit in field 1020, which is expressed as follows, $$\begin{cases} -k, & \text{if Num\_P\_Cell} = 2; \\ +k, & \text{if Num\_P\_Cell} > 2. \end{cases}$$

Here, the position k can be encoded using two options. It is encoded within $\lceil \log_2 \text{Num\_Point} \rceil + 1$ bits, where the header bit indicates the sign. Moreover, arithmetic codec can also be employed. Thus, encoding the number of duplicate points can be implemented by encoding (Num_P_Cell−3) within 4 bits. FIG. 10 illustrates the definitions in the bitstream.

During decoding of the point positions, the spatial tree is reconstructed layer by layer. For the cells containing duplicate points, $\lfloor \log_2 \text{Num\_DPCell\_Max} \rfloor$ bits are first read to decode the number of these cells Num_DPCell. Then, for each cell, $\lceil \log_2 \text{Num\_Point} \rceil + 1$ bits are then read to decode the position k. If the header bit is 0, no more bits are read and the number of accommodated points in the cell Num_P_Cell is recorded as 2. If the header bit is not 0, another 4 bits are read to decode the number, which plus 3 is the decoded Num_P_Cell. Thus, the decoding procedure is finished until Num_DPCell cells have been decoded successively. Similar to conventional decoding methods, the points can be finally reconstructed.

In the present embodiment, the size encompassing the points in the cell is determined after comparing the number of points in the cell to the maximum number of duplicate cells allowed in the cell. However, it is clear that the present principles may also provide for determining the size before, or without regard to, the number of points in the cell.

Figure 11:
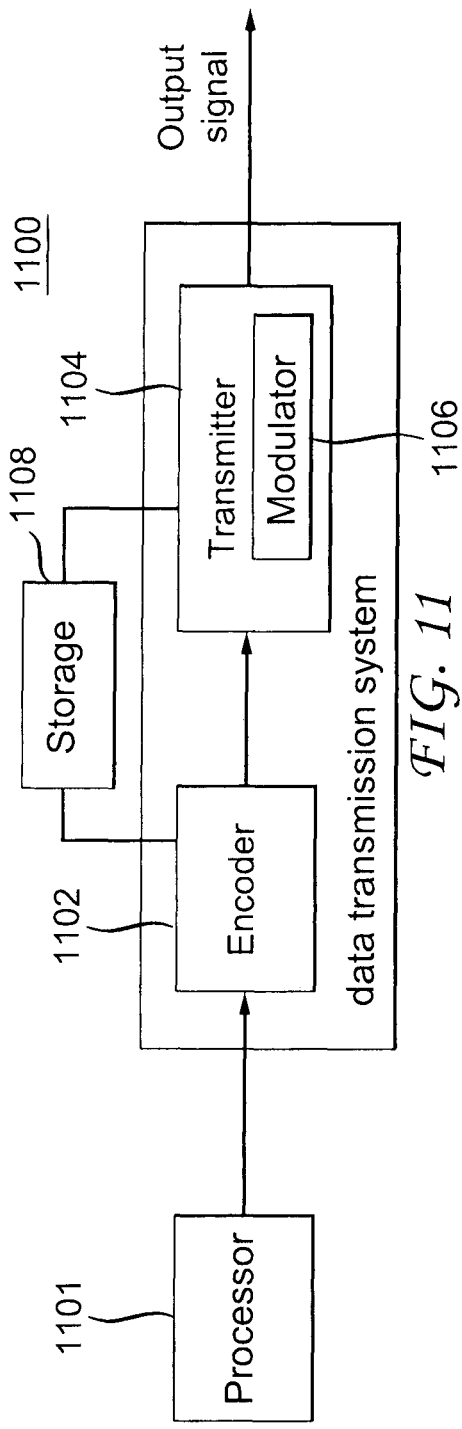
FIG. 11 is a block diagram depicting an example of a data processing system that may be used with one or more implementations.

Referring now to FIG. 11, a data transmission system or apparatus 1100 is shown, to which the features and principles described above may be applied. The data transmission system or apparatus 1100 may be, for example, a head-end or transmission system for transmitting a signal using any of a variety of media, such as, for example, satellite, cable, telephone-line, or terrestrial broadcast. The data transmission system or apparatus 1100 also, or alternatively, may be used, for example, to provide a signal for storage. The transmission may be provided over the Internet or some other network. The data transmission system or apparatus 1100 is capable of generating and delivering, for example, video content and other content such as, for example, 3D mesh models.

The data transmission system or apparatus 1100 receives processed data and other information from a processor 1101. In one implementation, the processor 1101 processes geometry data of 3D mesh models to generate sequences of symbols as described above.

The data transmission system or apparatus 1100 includes an encoder 1102 and a transmitter 1104 capable of transmitting the encoded signal. The encoder 1102 receives data information from the processor 1101. The encoder 1102 generates an encoded signal(s). The entropy encoding engine of encoder 1102 may be, for example, arithmetic coding or Huffman coding.

The encoder 1102 may include sub-modules, including for example an assembly unit for receiving and assembling various pieces of information into a structured format for storage or transmission. The various pieces of information may include, for example, coded or uncoded video, and coded or uncoded elements such as, for example, substream length indicator, and syntax elements. In some implementations, the encoder 1102 includes the processor 1101 and therefore performs the operations of the processor 1101.

The transmitter 1104 receives the encoded signal(s) from the encoder 1102 and transmits the encoded signal(s) in one or more output signals. The transmitter 1104 may be, for example, adapted to transmit a program signal having one or more bitstreams representing encoded pictures and/or information related thereto. Typical transmitters perform functions such as, for example, one or more of providing error-correction coding, interleaving the data in the signal, randomizing the energy in the signal, and modulating the signal onto one or more carriers using a modulator 1106. The transmitter 1104 may include, or interface with, an antenna (not shown). Further, implementations of the transmitter 1104 may be limited to the modulator 1106.

The data transmission system or apparatus 1100 is also communicatively coupled to a storage unit 1108. In one implementation, the storage unit 1108 is coupled to the encoder 1102, and stores an encoded bitstream from the encoder 1102. In another implementation, the storage unit 1108 is coupled to the transmitter 1104, and stores a bitstream from the transmitter 1104. The bitstream from the transmitter 1104 may include, for example, one or more encoded bitstreams that have been further processed by the transmitter 1104. The storage unit 1108 is, in different implementations, one or more of a standard DVD, a Blu-Ray disc, a hard drive, or some other storage device.

Figure 12:
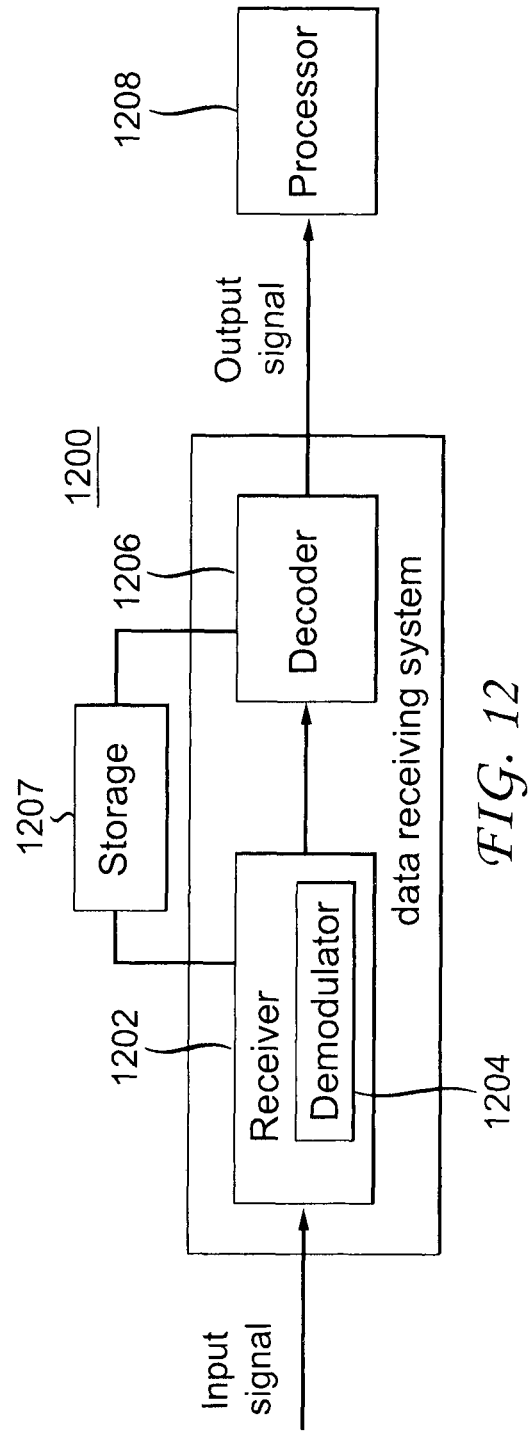
FIG. 12 is a block diagram depicting another example of a data processing system that may be used with one or more implementations.

Referring now to FIG. 12, a data receiving system or apparatus 1200 is shown to which the features and principles described above may be applied. The data receiving system or apparatus 1200 may be configured to receive signals over a variety of media, such as, for example, storage device, satellite, cable, telephone-line, or terrestrial broadcast. The signals may be received over the Internet or some other network.

The data receiving system or apparatus 1200 may be, for example, a cell-phone, a computer, a set-top box, a television, or other device that receives encoded video and provides, for example, decoded video signal for display (display to a user, for example), for processing, or for storage. Thus, the data receiving system or apparatus 1200 may provide its output signal to, for example, a screen of a television, a computer monitor, a computer (for storage, processing, or display), or some other storage, processing, or display device.

The data receiving system or apparatus 1200 is capable of receiving and processing data information, and the data information may include, for example, 3D mesh models. The data receiving system or apparatus 1200 includes a receiver 1202 for receiving an encoded signal, such as, for example, the signals described in the implementations of this application. The receiver 1202 may receive, for example, a signal providing one or more of the 3D mesh models and/or texture images, or a signal output from the data transmission system 1100 of FIG. 11.

The receiver 1202 may be, for example, adapted to receive a program signal having a plurality of bitstreams representing encoded pictures. Typical receivers perform functions such as, for example, one or more of receiving a modulated and encoded data signal, demodulating the data signal from one or more carriers using a demodulator 1204, de-randomizing the energy in the signal, de-interleaving the data in the signal, and error-correction decoding the signal. The receiver 1202 may include, or interface with, an antenna (not shown). Implementations of the receiver 1202 may be limited to the demodulator 1204.

The data receiving system or apparatus 1200 includes a decoder 1206. The receiver 1202 provides a received signal to the decoder 1206. The signal provided to the decoder 1206 by the receiver 1202 may include one or more encoded bitstreams. The decoder 1206 outputs a decoded signal, such as, for example, decoded output signals including video information.

The data receiving system or apparatus 1200 is also communicatively coupled to a storage unit 1207. In one implementation, the storage unit 1207 is coupled to the receiver 1202, and the receiver 1202 accesses a bitstream from the storage unit 1207. In another implementation, the storage unit 1207 is coupled to the decoder 1206, and the decoder 1206 accesses a bitstream from the storage unit 1207. The bitstream accessed from the storage unit 1207 includes, in different implementations, one or more encoded bitstreams. The storage unit 1207 is, in different implementations, one or more of a standard DVD, a Blu-Ray disc, a hard drive, or some other storage device.

The output signal from the decoder 1206 is provided, in one implementation, to a processor 1208. The processor 1208 is, in one implementation, a processor configured for performing 3D mesh model reconstruction. In some implementations, the decoder 1206 includes the processor 1208 and therefore performs the operations of the processor 1208. In other implementations, the processor 1208 is part of a downstream device such as, for example, a set-top box or a television.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C" and "at least one of A, B, or C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Additionally, many implementations may be implemented in one or more of an encoder (for example, the encoder 1102), a decoder (for example, the decoder 1206), a post-processor (for example, the processor 1208) processing output from a decoder, or a pre-processor (for example, the processor 1101) providing input to an encoder. Further, other implementations are contemplated by this disclosure.

Implementations of the various processes and features described herein may be embodied in a variety of different equipment or applications, particularly, for example, equipment or applications associated with data encoding, data decoding, 3D modeling, 3D reconstruction, and other processing of 3D computer graphics. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, a game console, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method of generating a 3D mesh model by constructing
an octree data structure corresponding to a region, comprising:
selecting a cell within the region;
determining whether the cell includes a number of points in the cell which is less than a maximum number of points;
if the cell has the number of the points in the cell which is less than the maximum number, then determining whether the points in the cell are duplicate points, wherein the points are considered duplicate points when the distance between the points in the cell are below a threshold distance;
if the cell includes duplicate points, recording cell information indicating presence of the duplicate points for the cell, and stopping further sub-dividing of the cell, otherwise subdividing the cell; and
recursively dividing a bounding box into cells by repeating the selecting, determining and subdividing steps to construct the octree data structure, wherein the octree data structure represents the region of a 3D mesh model;
if the cell includes a plurality of non-duplicate points, subdividing the cell into a plurality of sub-divided cells,
determining whether the sub-divided cells include one of a point, duplicate points or a plurality of points,
recursively repeating the sub-dividing and determining until all of the subdivided cells, or subsequently sub-divided cells, include only a point or duplicate points.

2. The method of claim 1, wherein the determining whether points in the cell are duplicate comprises:
computing size of an area encompassing the points in the area;
comparing the size to a predetermined threshold size; and
determining that the points are duplicate when the computed size is smaller than the predetermined threshold size.

3. The method of claim 2, wherein
if the number of points in the area correspond to {pi,k, o>Pi,k,i> - - - ,Pi,k,m, • • • ), the center of the points corresponds to pcenter=Num 1 Y.mPi,k,m, and the size corresponds to Sizei^J(pcenterx Xmax) "1" {vcentery Ymax^) "1" (pcenterz zmax)>the area is determined to include duplicate points if the calculated size is smaller than Z3P=ir4nh^-,h
the predetermined threshold size corresponding to \-^1, ^15.

4. The method of claim 1, wherein the recording comprises generating a bitstream having a data field including at least one of a number of duplicate points field, a position field and the number of points in the cell field.

5. A computer readable medium having stored thereon instructions for performing the steps of claim 1.

6. A computer readable medium having stored thereon a symbol sequence generated by the steps of claim 1.

7. An encoder for generating a 3D mesh model by constructing an octree data structure corresponding to a region, comprising:
   a processor configured to select a cell within the region; the processor is further configured to determine whether the cell includes a number of points in the cell which is less than a maximum number of points; if the cell has the number of the points in the cell which is less than the maximum number, then determine whether the points in the cell are duplicate points, wherein the points are considered duplicate points when the distance between the points in the cell are below a threshold distance; if the cell includes duplicate points, record cell information indicating presence of the duplicate points for the cell, and stopping further subdividing of the cell, otherwise subdividing the cell; and
   recursively dividing a bounding box into cells by repeating the selecting, determining and subdividing steps to construct the octree data structure, wherein the octree data structure constructed by the encoder represents the region of a 3D mesh model;
if the cell includes a plurality of non-duplicate points, subdividing the cell into a plurality of sub-divided cells, determining whether the sub-divided cells include one of a point, duplicate points or a plurality of points,
recursively repeating the sub-dividing and determining until all of the subdivided cells, or subsequently subdivided cells, include only a point or duplicate points.

* * * * *